United States Patent
Milby et al.

(10) Patent No.: US 7,904,419 B1
(45) Date of Patent: Mar. 8, 2011

(54) MANAGING ALLOCATION OF TEMPORARY AND PERMANENT FILES IN A DATABASE SYSTEM

(75) Inventors: Gregory H. Milby, San Marcos, CA (US); Steven C. Grolemund, Poway, CA (US); Susan E. Choo, Los Angeles, CA (US)

(73) Assignee: Teradata US, Inc., Dayton, OH (US)

( * ) Notice: Subject to any disclaimer, the term of this patent is extended or adjusted under 35 U.S.C. 154(b) by 2636 days.

(21) Appl. No.: 09/733,530

(22) Filed: Dec. 8, 2000

(51) Int. Cl.
*G06F 17/00* (2006.01)
(52) U.S. Cl. .......... 707/614; 707/633; 707/675; 707/685
(58) Field of Classification Search .................. 707/2, 3, 707/10, 205, 614, 633, 675, 685; 711/156
See application file for complete search history.

(56) References Cited

U.S. PATENT DOCUMENTS

| | | | |
|---|---|---|---|
| 5,303,383 A | 4/1994 | Neches et al. | |
| 5,640,584 A | 6/1997 | Kandasamy et al. | |
| 5,872,904 A | 2/1999 | McMillen et al. | |
| 5,963,935 A * | 10/1999 | Ozbutun et al. | 707/3 |
| 6,175,900 B1 * | 1/2001 | Forin et al. | 711/156 |
| 6,470,360 B1 * | 10/2002 | Vaitheeswaran | 707/205 |
| 6,571,259 B1 * | 5/2003 | Zheng et al. | 707/205 |

* cited by examiner

*Primary Examiner* — Sana Al-Hashemi
(74) *Attorney, Agent, or Firm* — Trop, Pruner & Hu P.C.

(57) ABSTRACT

A database system includes a plurality of access modules and corresponding persistent storage devices each having a pool of storage elements that can be allocated to store permanent files and temporary files. Each access module is associated with a non-persistent file management context and each storage device contains a persistent file management context. The persistent file management context indicates allocation of permanent files, while the non-persistent file management context indicates the allocation of both permanent and temporary files.

28 Claims, 5 Drawing Sheets

US 7,904,419 B1

MANAGING ALLOCATION OF TEMPORARY AND PERMANENT FILES IN A DATABASE SYSTEM

TECHNICAL FIELD

The invention relates to managing allocation of temporary and permanent files in a database system.

BACKGROUND

Database systems are used to collect and store various types of information that are later extracted for viewing or manipulation. Various different types of database systems exist, including relational database systems, object relational database systems, and others. Relational database systems store data in relational tables. When a query, such as a Structured Query Language (SQL) query is received, a subset of the data is extracted from one or more relational tables.

Many typical database systems divide data into different storage regions, such as system storage, permanent storage, and temporary storage. System storage contains data associated with the operation and configuration of the database system. Permanent storage typically is used to store user data. The storage is "permanent" in the sense that stored data remains in storage until deleted or modified by a request to delete or update the data. Temporary storage is typically used to store intermediate or final results of a query. The data in temporary storage is usually discarded after the query has completed so that the temporary storage can be used by other database operations.

The behavior of the database control logic differs when accessing data in the permanent and temporary storage regions. When accessing the permanent storage region, the database control logic usually acquires transaction locks to prevent one operation from interfering with another operation, logs data changes, and maintains context information to enable recovery of data if a system crash occurs. However, such tasks are usually not performed when accessing data in the temporary storage region.

To allow different treatment of the different storage regions, the database control logic may have to be separated for the different types of files. This allows the database control logic responsible for the temporary storage region to avoid some of the management overhead associated with the permanent storage region. However, the separation of the database control logic for temporary and permanent files creates other inefficiencies. For example, the storage space allocated for temporary storage may not be available for permanent storage, and vice versa.

SUMMARY

In general, a method for use in a database system having a persistent storage device and a non-persistent memory comprises storing a first file management context in the persistent storage device, and storing a second file management context in the non-persistent memory. Both the first and second file management contexts are updated to allocate a permanent file, and the second file management context is updated without updating the first file management context to allocate a temporary file.

Other or alternative features will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

Figure 1:
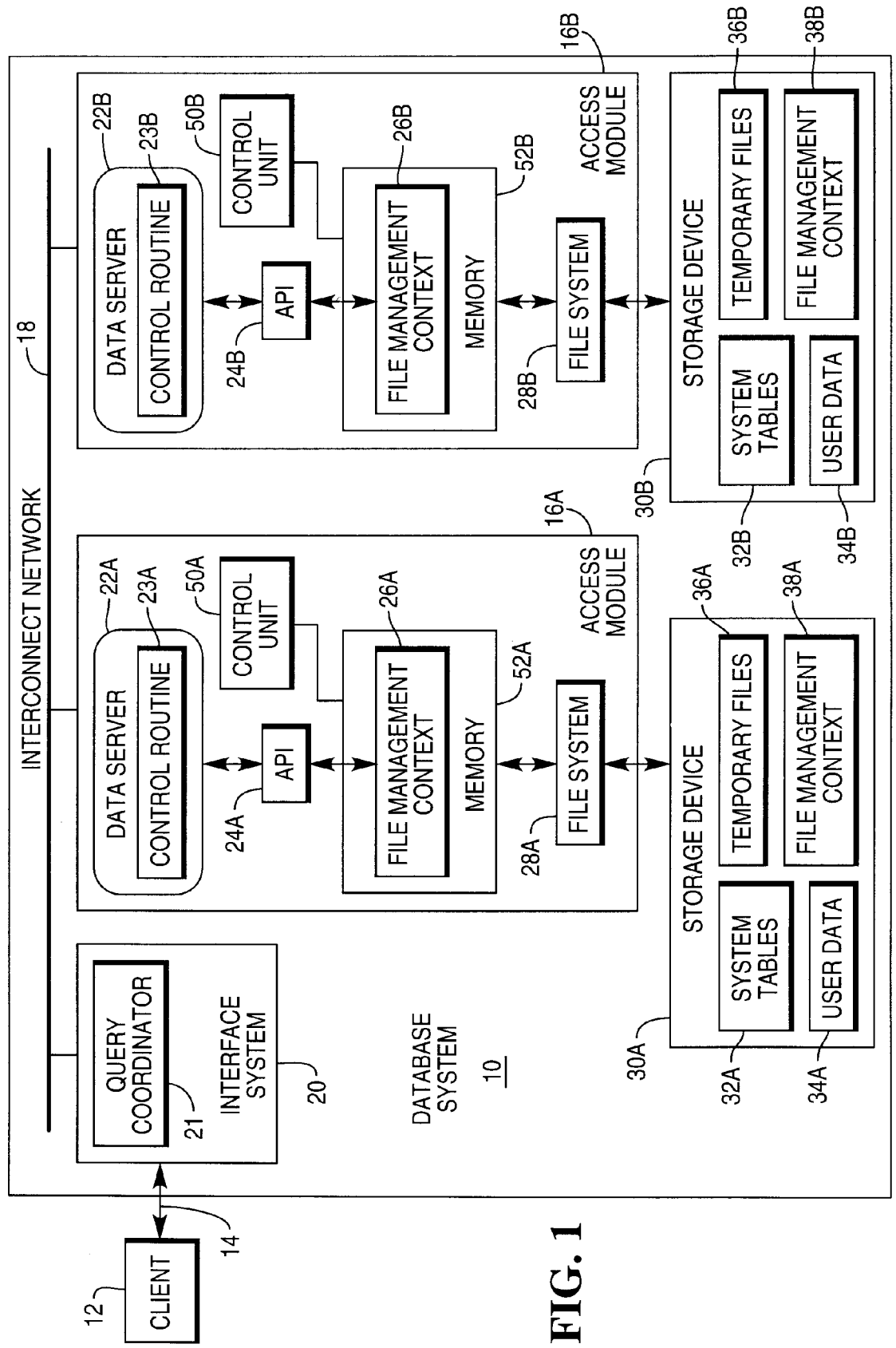
FIG. 1 is a block diagram of one embodiment of a database system having plural access modules associated with corresponding storage units.

FIG. 1 illustrates one example embodiment of a database system 10 that is coupled to a client system 12 over a network 14. Examples of the network 14 include a local area network (LAN), a wide area network (WAN), or a public network (such as the Internet). A user at the client system 12 can issue requests, such as Structured Query Language (SQL) requests, to the database system 10 to extract data stored in the database system 10. SQL is the language of relational databases, and is defined by the American National Standards Institute (ANSI).

In the illustrated embodiment, the database system 10 includes multiple nodes 16A and 16B (two or more). In an alternative embodiment, the database system 12 can also be a single-node system. The nodes 16A and 16B are coupled by an interconnect network 18, which is in turn connected to an interface system 20. The interface system 20 includes a query coordinator 21 to receive queries from the client 12, to parse the received requests, and to generate access requests to one or more data servers 22A, 22B in corresponding nodes 16A, 16B. Each node 16A, 16B includes respective one or more control units 50A, 50B that are coupled to a respective memory 52A, 52B, which can be main memory, a cache, or some other form of storage.

Each data server 22A, 22B controls access to a respective storage unit 30A, 30B. The data servers 22A, 22B can also be referred to as "access modules" for the storage units 30A, 30B. In one embodiment, the database system 10 is a relational database management system or an object relational database management system. User data 34A, 34B are contained in relational tables in respective storage units 30A, 30B. The storage units 30A, 30B also contain respective system tables 32A, 32B for storing system operational and configuration information. In addition, the storage units 30A, 30B contain temporary files 36A, 36B that are used to store intermediate or final results of database operations.

The user data 34 is stored in a permanent storage region of the storage unit 30, while the temporary files 36 are stored in a temporary storage region of the storage unit 30. The user data 34 are stored in "permanent" files. Such files are considered "permanent" in the sense that they are not lost in the event of system crashes, resets, or power cycles. However, permanent files can be changed or deleted by user requests during normal operation of the database system 10. A "file" refers to any apportionment of data in the database system—for example, a file can refer to a row or column of a relational table or to some other apportionment.

In accordance with some embodiments of the invention, the permanent storage region and temporary storage region are part of the same pool of storage resources in each storage unit. For example, the pool of storage resources includes blocks or pages (generally referred to as "storage elements") in the storage unit 30.

By employing file management contexts in accordance with some embodiments, a block or a group of blocks can be selectively allocated to either permanent or temporary storage. Two groups of file management contexts are maintained: a first group 38 (referred to as "persistent file management context") is stored in the storage unit 30; and a second group 26 (referred to as "non-persistent file management context") is stored in the memory 52 of each node 16. The storage unit 30 in one embodiment is a persistent storage unit. A persistent storage unit maintains stored data even if power is removed from the database system or the database system is reset. However, the second group 26 is stored in a non-persistent storage unit, such as the memory 52 in the node 16. Examples of the memory 52 include dynamic random access memories (DRAMs), static random access memories (SRAMs), and the like.

In one embodiment, the file management context in either persistent or non-persistent storage includes two maps: a first map to allocate storage identifiers for uniquely identifying each file created in the database system, and a second map to allocate allocation units, which are blocks or pages of storage in the storage units 30A, 30B. Each map contains flags that can be set to indicate allocation of a storage identifier or allocation unit. The flags can be released to indicate when a storage identifier or allocation unit has been released.

A file management context control routine or module 23 in each data server 22 is capable of accessing the file management context 26 through an application programming interface (API) 24, which defines a collection of API calls. In one example embodiment, the API 24 defines the following methods that are invocable by the file management context control routine 23: a method SET_STORAGE_ID( ) to allocate a temporary or permanent storage identifier; a method RELEASE_STORAGE_ID( ) to release a temporary or permanent storage identifier; a method SET_ALLOCATION_UNIT( ) to allocate blocks of storage; and a method RELEASE_ALLOCATION_UNIT( ) to release blocks of storage.

To access the storage units 30A, 30B, the data servers 22A, 22B issue requests to respective file systems 28A, 28B. The file systems 28A, 28B then generate commands to the storage units 30A, 30B to access data in the storage units 30A, 30B.

The database system 10 according to the arrangement of FIG. 1 is provided as an example only. In other embodiments, other arrangements of the database system can be utilized. For example, another database system is the Teradata database system from NCR Corporation. The Teradata database system includes a parsing engine that interprets SQL statements and controls the dispatch of requests to virtual access module processors (VAMPs) in one or more nodes. The VAMPs control extraction or manipulation of data stored in respective storage units.

Figure 2:
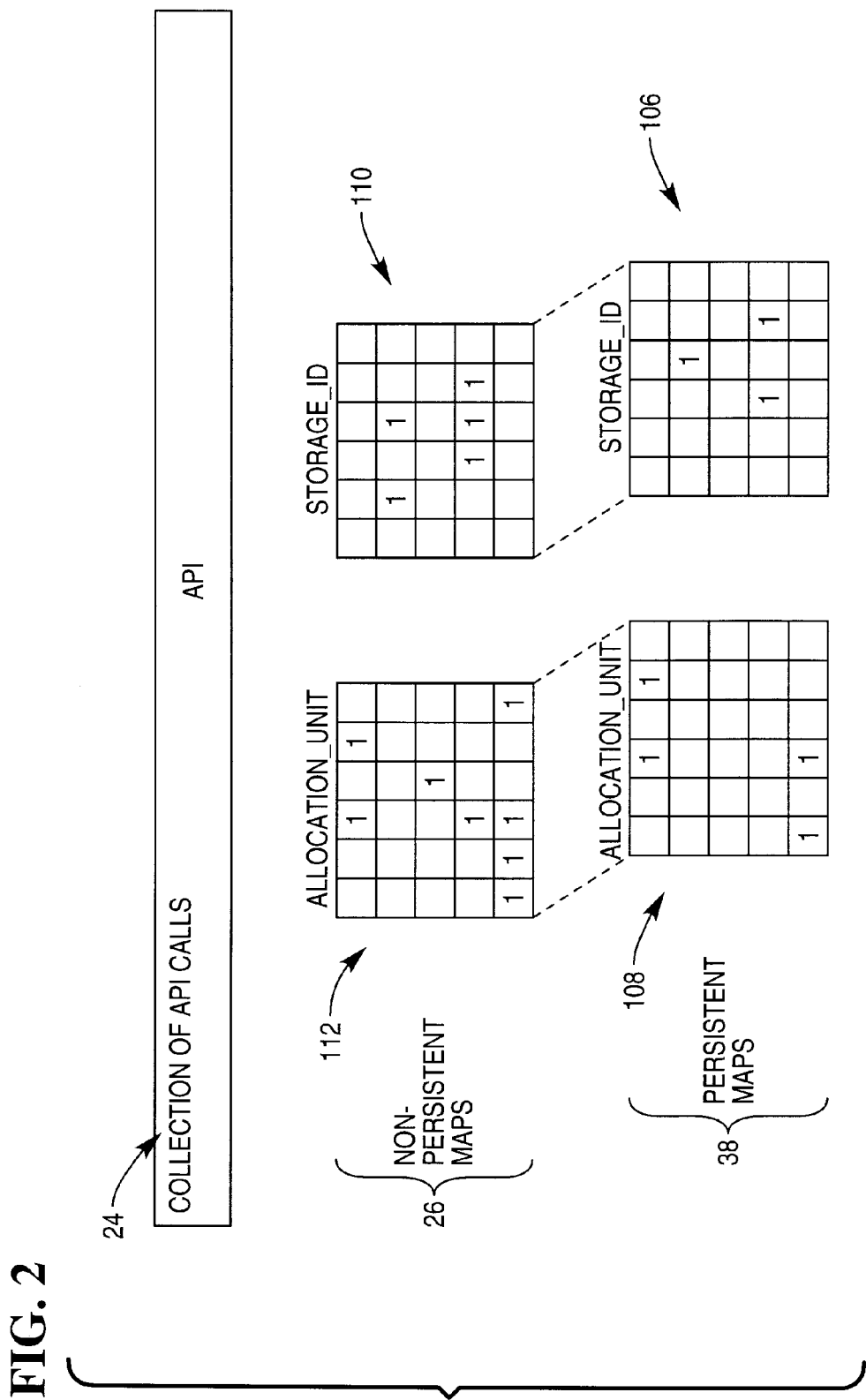
FIG. 2 illustrates maps corresponding to file management contexts for temporary storage and permanent storage in the database system of FIG. 1.

FIG. 2 illustrates one example of file management contexts stored in the database system 10. The persistent version 38 of the file management context is stored in the persistent storage unit 30, while the non-persistent version 26 of the file management context is stored in non-persistent storage 52.

The persistent file management context 38 includes a STORAGE_ID map 106 (to allocate storage identifiers to permanent files) and an ALLOCATION_UNIT map 108 to allocate blocks or pages to permanent files). Each map 106 or 108 includes an array of flags that can be set to a "1" or "0" state. A "1" or active state indicates that a storage ID or an allocation unit has been allocated to a permanent file.

The non-persistent file management context 26 also includes a STORAGE_ID map 110 and an ALLOCATION_UNIT map 112. Whereas the maps 106 and 108 in persistent storage are used to allocate storage IDs or allocation units to permanent files, the maps 110 and 112 are used to allocate storage IDs or allocation unit to both permanent and temporary files. The persistent maps 106 and 108 are subsets of respective non-persistent maps 110 and 112. Each of the STORAGE_ID and ALLOCATION_UNIT maps 110 and 112 includes flags that can be set to a "1" or "0" state, with some of the flags corresponding to permanent files and others corresponding to temporary files.

Even though the same pool of storage elements are used to store both temporary and permanent files, the control logic in the data server 22 performs different management functions depending on whether a flag that is set in the STORAGE_ID or ALLOCATION_UNIT maps correspond to a temporary file or permanent file. For a permanent file, the control logic in the data server 22 performs transaction locking, logging of data changes made to the maps, and performs tasks to provide data consistency across restart boundaries. Allocation of a permanent file is indicated when the persistent STORAGE_ID map 106 or ALLOCATION_UNIT map 108 is updated. However, when a temporary file is allocated, and the non-persistent maps 110 and 112 are updated without updating the persistent maps 106 and 108, the control logic in the data server 22 does not perform transaction locking, logging of data changes made to the maps, and performing tasks to provide data consistency across restart boundaries.

Storage capacity is made more efficient by combining the pool of storage elements to store both temporary and permanent files. At the same time management overhead is reduced by performing certain tasks only if permanent files are allocated.

Figure 4:
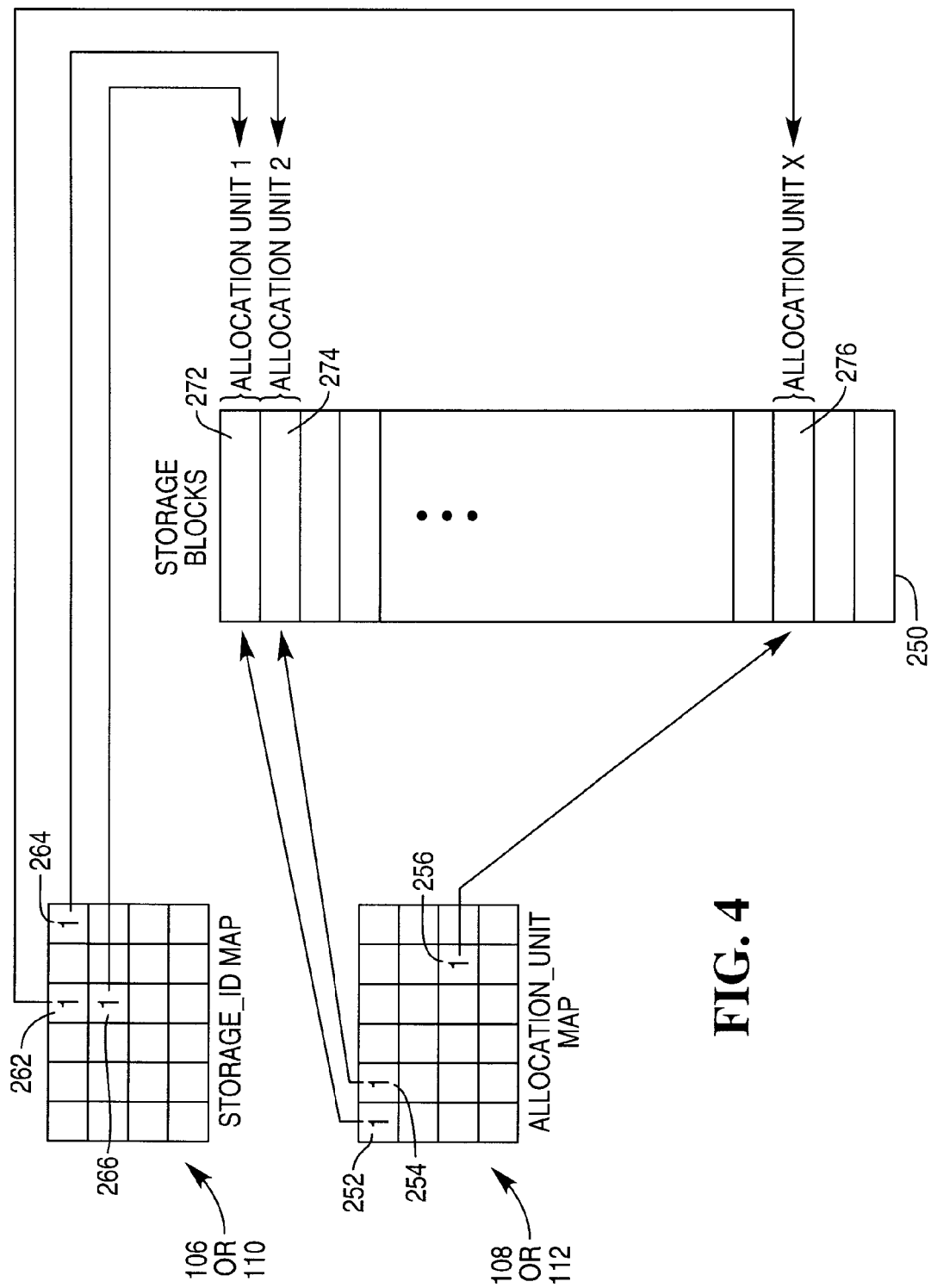
FIG. 4 illustrates mapping of allocation units and storage identifiers in accordance with one example.

FIG. 4 illustrates how flags in the STORAGE_ID map 106 or 110 and in the ALLOCATION_UNIT map 108 or 112 correspond to storage blocks 250. A first flag 252 in the ALLOCATION_UNIT map is set to the active "1" state, which allocates a storage block 272 (which is referred to as Allocation Unit 1). Similarly, flags 254 and 256 in the ALLOCATION_UNIT map are set to active "1" states to allocate respective block 274 (referred to as Allocation Unit 2) and block 276 (referred to as Allocation Unit X), respectively. Although the example shows one storage block per allocation unit, multiple storage blocks can be in one allocation unit. If multiple blocks are assigned to one allocation unit, then corresponding multiple flags in the ALLOCATION_UNIT map are set active. Flags 262, 264, and 266 in the STORAGE_ID map are set to the active "1" state to allocate storage identifiers to Allocation Units 1, 2, and X.

Figure 3:
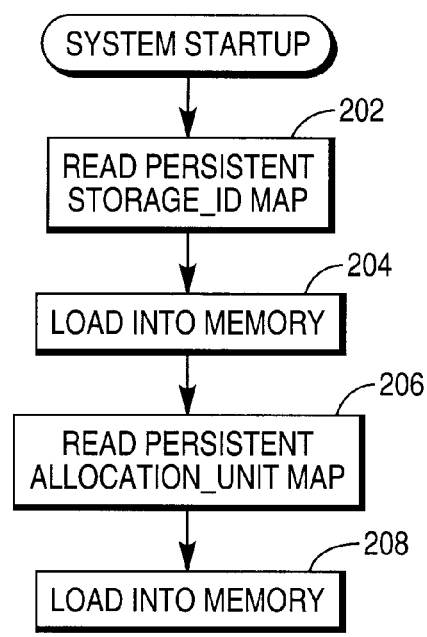
FIG. 3 is a flow diagram of a process performed in the database system in connection with the file management contexts at system startup.

FIG. 3 shows tasks performed by the data server 22 at system startup as they relate to the file management contexts 26 and 38. The file management context control routine 23 in each node 16 that is starting up reads (at 202) a persistent version of the STORAGE_ID map 106 contained in the storage unit 30 and loads (at 204) the map into the memory 52 of the node 16. The map loaded into the memory 52 is the non-persistent STORAGE_ID map 110. The file management context routine 23 also reads (at 206) the persistent version of the ALLOCATION_UNIT map 108 and loads (at 208) the map into the memory 52 of the node 16. This loaded map is the non-persistent ALLOCATION_UNIT map 112.

Figure 5:
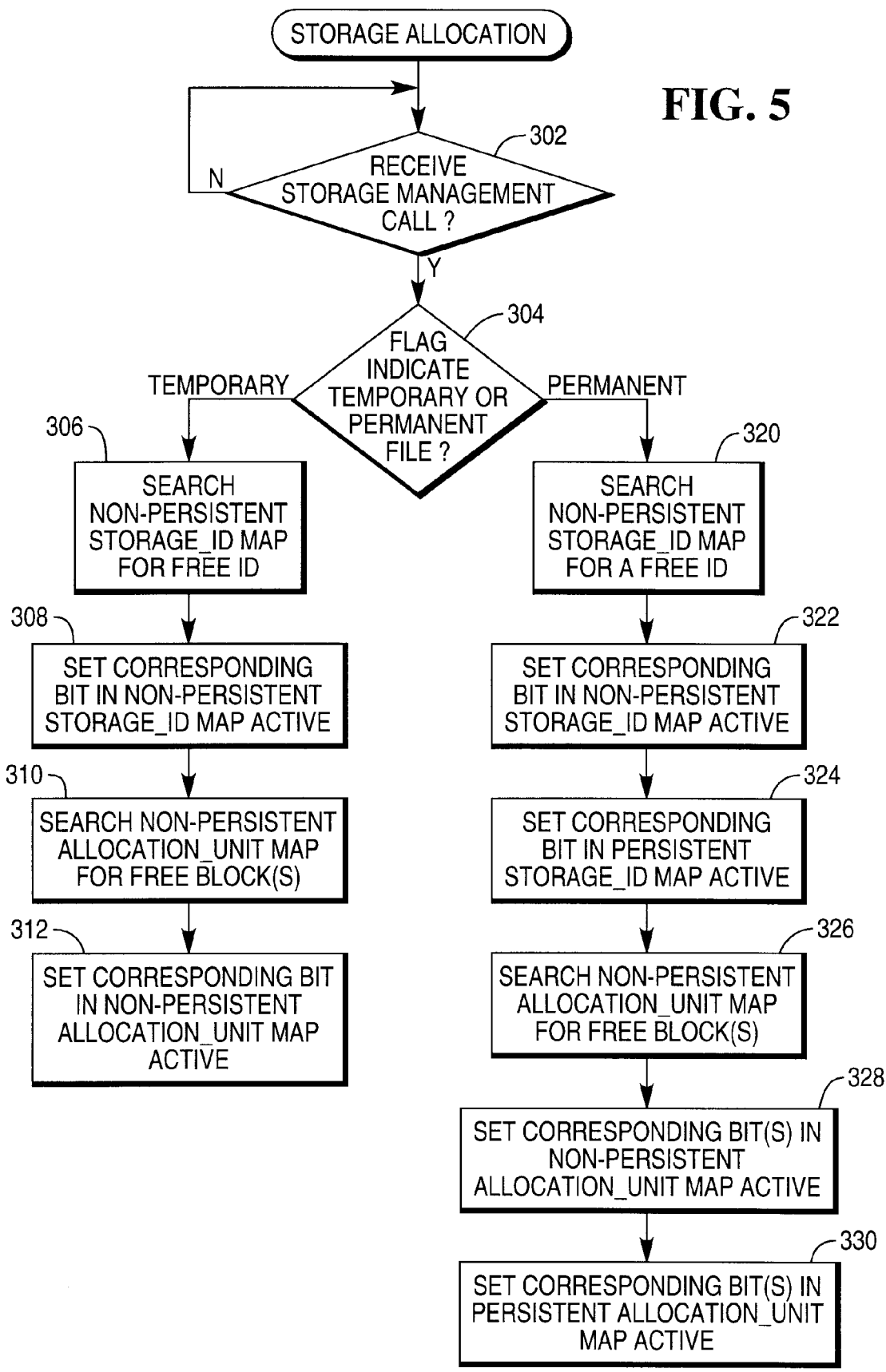
FIG. 5 is a flow diagram of a process to perform allocation of temporary and permanent storage, in accordance with an embodiment.

In response to requests received from the query coordinator 21, the data server 22 issues calls to the file management context control routine 23 to perform storage allocation. Each storage management call contains a flag that identifies the class of storage desired: temporary or permanent. As shown in FIG. 5, when the file management context control routine 23 receives (at 302) a storage management call, it determines (at 304) if the flag in the storage management call indicates a temporary file or a permanent file. If the flag indicates a temporary file, then the file management context routine 23 searches (at 306) the in-memory or non-persistent STORAGE_ID map 110 to find a free storage identifier. The routine 23 then sets (at 308) the corresponding bit in the non-persistent STORAGE_ID map to an active state. This is accomplished by calling the SET_STORAGE_ID( ) method in the API 24 (FIG. 1). Next, the routine 23 searches (at 310) the non-persistent ALLOCATION_UNIT map 112 to find a free block or a group of free blocks. The corresponding bit(s) in the non-persistent ALLOCATION_UNIT map 112 are then set (at 312) to the active state by calling the SET_ALLOCATION_UNIT( ) method. Plural bits are set if the allocation unit contains plural storage blocks.

For temporary files, only the non-persistent maps 110 and 112 are updated; the persistent 106 and 108 remain unchanged. When a temporary file is deleted, the API methods RELEASE_STORAGE_ID( ) and RELEASE_ALLOCATION_UNIT( ) are called to release flags (set the flags to the inactive state) in the maps 110 and 112.

However, if the flag in the storage management call indicates a permanent file (as detected at 304), then the file management context control routine 23 searches (at 320) the non-persistent STORAGE_ID map 110 for a free storage identifier. The corresponding bit in the non-persistent STORAGE_ID map 110 is then set (at 322) to an active state. In addition, the file management context control routine 23 also sets (at 324) a corresponding bit in the persistent STORAGE_ID map 106 to an active state. Setting flags in the STORAGE_ID maps 106 and 108 are accomplished with respective calls of the SET_STORAGE_ID( )method.

Next, the routine 23 searches (at 326) the non-persistent ALLOCATION_UNIT map 112 for a free block or a group of free blocks. The routine 23 then sets (at 328) the corresponding bit(s) in the non-persistent ALLOCATION_UNIT map 112 to an active state. The corresponding bit in the persistent ALLOCATION_UNIT map 108 is also set (at 330) in the persistent ALLOCATION_UNIT map to the active state. Setting flags in the ALLOCATION_UNIT maps are accomplished by calling the SET_ALLOCATION_UNIT( ) method.

In the operation discussed above, when the control logic in each data server 22 detects that the persistent maps 106 and 108 are updated (indicating that a permanent file is being allocated), the control logic performs transaction locking, data change logging, and other tasks to provide data consistency across restart boundaries. Such tasks are not performed when a temporary file is allocated.

The persistent maps 106 and 108 can be considered to be "shadows" of the non-persistent maps 110 and 112. In the event of a system crash or reset, the persistent maps 106 and 108 are maintained in the persistent storage units 30A, 30B so that permanent files are not lost as a result of the system crash or reset. However, the non-persistent maps 110 and 112 are lost, which effectively erases any allocated temporary files.

The various software routines or modules discussed above are executable on corresponding one or more control units in the database system 10. Each of the control units includes a microprocessor, a microcontroller, a processor card (including one or more microprocessors or microcontrollers), or other control or computing devices. As used here, a "controller" refers to hardware, software, or a combination of both. A "controller" can refer to a single component or to plural components (whether software or hardware).

The storage units or devices referred to herein include one or more machine-readable storage media for storing data and instructions. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Instructions that make up the various software routines or modules are stored in respective storage units. The instructions when executed by a respective control unit cause the corresponding system to perform programmed acts.

The instructions of the software routines or modules are loaded or transported to each system in one of many different ways. For example, code segments including instructions stored on floppy disks, CD or DVD media, a hard disk, or transported through a network interface card, modem, or other interface device are loaded into the system and executed as corresponding software routines or modules. In the loading or transport process, data signals that are embodied in carrier waves (transmitted over telephone lines, network lines, wireless links, cables, and the like) communicate the code segments, including instructions, to the system. Such carrier waves are in the form of electrical, optical, acoustical, electromagnetic, or other types of signals.

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A database system comprising:
   a persistent data storage device storing a first file management context and having a pool of storage elements; and
   a non-persistent memory storing a second file management context,
   the first file management context to indicate allocated permanent files in the pool of storage elements, and
   the second file management context to indicate allocated temporary files and permanent files in the pool of storage elements.

2. A method for use in a database system having a persistent storage device and a non-persistent memory, comprising:
   storing a first file management context in the persistent storage device;
   storing a second file management context in the non-persistent memory;
   updating both the first and second file management contexts to allocate a permanent file; and
   updating the second file management context without updating the first file management context to allocate a temporary file.

3. An article comprising at least one storage medium containing instructions that when executed case a system to:
   store a first file management context to indicate allocation of temporary and permanent filed; and store a second file management context to indicate allocation of permanent filed;

receive a request containing a flag to indicate a permanent file or a temporary file;

update both the first and second file management context if the flag indicates a permanent file; and update the second file management context without updating the first file management context if the flag indicates a temporary filed.

4. An article comprising at least one storage medium containing instructions that when executed cause a system to:

store a first file management context in non-persistent memory to indicate allocation of temporary and permanent files; and store a second file management context in persistent storage to indicate allocation of permanent files.

5. The database system of claim 1, wherein the first file management context is a subset of the second file management context.

6. The database system of claim 1, further comprising a control module adapted to update an entry in the second file management context without updating an entry in the first file management context to allocate a temporary file.

7. The database system of claim 1, wherein the pool of storage elements comprises a pool of storage blocks.

8. The database system of claim 1, further comprising an access module containing the non-persistent memory.

9. The database management system of claim 1, wherein the permanent files contain user data and the temporary files contain results of queries.

10. The database system of claim 1, further comprising a controller adapted to:

perform at least one of a transaction locking and database logging operation in response to detecting an update of the first file management context; and not perform the transaction locking and database logging operations in response to detecting an update of the second file management context without an update of the first file management context.

11. The method of claim 2, further comprising maintaining the first file management context despite system reset, wherein the second file management context is lost due to the system reset.

12. The method of claim 2, wherein the first file management context contains a storage identifier map to allocate storage identifiers and an allocation unit map to allocate blocks in the persistent storage device, and wherein updating the first file management context comprises updating the storage identifier map and the allocation unit map.

13. The method of claim 2, further comprising receiving a request, the request containing a flag to indicate allocation of a temporary file or a permanent file, wherein updating one or both of the first and second file management contexts is based on the flag.

14. The method of claim 2, further comprising copying the first file management context to the non-persistent memory upon system startup.

15. The method of claim 2, further comprising performing at least one of a transaction locking and database logging operation when updating the first file management context and not performing the transaction locking or database logging operation when updating the second file management context without updating the first file management context.

16. The article of claim 3, wherein the instructions when executed cause the system to update the first file management context by updating a first storage identifier map and a first allocation unit map, and update the second file management context by updating a second storage identifier map and a second allocation unit map.

17. The article of claim 4, wherein the instructions when executed cause the system to:

update both the first and second file management contexts to allocate a permanent file, update the first file management context without updating the second file management context to allocate a temporary file.

18. The database system of claim 6, wherein the control module is adapted to update an entry in both the first and second file management contexts to allocate a permanent file.

19. The database system of claim 7, further comprising a control module adapted to allocate one or more of the storage blocks to a temporary file or a permanent file.

20. The database system of claim 7, wherein the first file management context contains a first storage identifier map and a first allocation unit map, the first storage identifier map indicating which storage identifiers have been allocated to permanent files, and the first allocation unit map indicating which storage blocks have been allocated to permanent files.

21. The database system of claim 8, wherein the access module comprises a data server to control access of the data storage device.

22. The database system of claim 8, wherein the access module is adapted to copy the first file management context from the persistent data storage device to the non-persistent memory upon system restart.

23. The database system of claim 8, further comprising:

one or more other access modules;

one or more other persistent storage devices accessible by the corresponding one or more other access modules; and one or more other first and second file management contexts corresponding to the one or more other access modules.

24. The database management system of claim 8, wherein the access module performs at least one of a transaction locking and database logging operation when updating the first file management context, and the access module is adapted not to perform the transaction locking and database logging operations when updating the second file management context but not updating the first file management context.

25. The method of claim 12, wherein the second file management context contains a storage identifier map to allocate storage identifiers and an allocation unit map to allocate blocks in the persistent storage device, and wherein updating the second file management context comprises updating the storage identifier map and the allocation unit map.

26. The article of claim 17, wherein the instructions when executed cause the system to:

perform at least one of a transaction locking and database logging operation in response to detecting an update of the second file management context; and not perform the transaction locking and database logging operations in response to detecting an update of the first file management context without an update of the second file management context.

27. The database system of claim 20, wherein the second file management context contains a second storage identifier map and a second allocation unit map, the second storage identifier map indicating which storage identifiers have been allocated to temporary and permanent files and the second allocation unit map indicating which storage blocks have been allocated to temporary and permanent files.

28. The database system of claim 21, further comprising an application programming interface containing methods invocable by the data server to access the first and second file management contexts.

* * * * *